US012726935B2

(12) United States Patent
Hao et al.

(10) Patent No.: US 12,726,935 B2
(45) Date of Patent: Sep. 1, 2026

(54) COMMUNICATION METHOD AND APPARATUS

(71) Applicant: HUAWEI TECHNOLOGIES CO., LTD., Shenzhen (CN)

(72) Inventors: Jinping Hao, Shanghai (CN); Mnghao Jin, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/428,250

(22) Filed: Jan. 31, 2024

(65) Prior Publication Data

US 2024/0244563 A1 Jul. 18, 2024

Related U.S. Application Data

(63) Continuation of application No. PCT/CN2022/110256, filed on Aug. 4, 2022.

(30) Foreign Application Priority Data

Aug. 6, 2021 (CN) ......................... 202110904540.2

(51) Int. Cl.
*H04W 64/00* (2009.01)
*H04W 36/08* (2009.01)

(52) U.S. Cl.
CPC ............ *H04W 64/00* (2013.01); *H04W 36/08* (2013.01)

(58) Field of Classification Search
CPC . H04W 64/00; H04W 36/08; H04W 36/0033; H04W 76/27; H04W 68/06; G01S 5/0036
See application file for complete search history.

(56) References Cited

U.S. PATENT DOCUMENTS 12,326,508 B2 * 6/2025 Fischer ................. H04W 76/19
2022/0120842 A1 * 4/2022 Edge ..................... H04W 64/00
(Continued)

FOREIGN PATENT DOCUMENTS

WO WO-2023132984 A1 * 7/2023 ........... H04L 5/0048

OTHER PUBLICATIONS

Huawei et al., "Considerations on UL Only Positioning Method in NR", 3GPP TSG-RAN WG2 Meeting #107bis, R2-1913039, Chongqing, China, XP051804083, Oct. 14-18, 2019, 6 pages.
(Continued)

*Primary Examiner* — Fayyaz Alam
(74) *Attorney, Agent, or Firm* — Maier & Maier, PLLC

(57) ABSTRACT

A communication method and apparatus. The method includes: a first access network device receives a retrieve UE context request message from a second access network device and sends first information to a positioning management network element. The first information indicates at least one of the following: an area change, update of a sounding reference signal (SRS) configuration, or update of an area. The area is an area in which the SRS configuration configured by the first access network device for a terminal is valid. One area includes at least one cell. That the first information indicates the area change is that the first information includes at least one of the following: the area change, moving out of the area, a cell change, moving out of a cell, an area identity, or a cell identity.

20 Claims, 5 Drawing Sheets

(56) References Cited

U.S. PATENT DOCUMENTS

| | | | | |
|---|---|---|---|---|
| 2023/0119824 | A1* | 4/2023 | You | H04L 5/0023 370/329 |
| 2023/0189380 | A1* | 6/2023 | Palat | H04W 76/11 370/329 |
| 2023/0221396 | A1* | 7/2023 | Fischer | H04L 5/0051 |

OTHER PUBLICATIONS

Qualcomm Incorporated, "Positioning of UEs in RRC Idle/Inactive State", 3GPP TSG-RAN WG2 Meeting #113-e, R2-2101470, Electronic, XP051974351, Jan. 25-Feb. 5, 2021, 10 pages.

* cited by examiner

RRC connected state

Release

RRC inactive state

Restore

Release

RRC idle state (a)

(a)

COMMUNICATION METHOD AND APPARATUS

CROSS-REFERENCE TO RELATED APPLICATIONS

This application is a continuation of International Application No. PCT/CN2022/110256, filed on Aug. 4, 2022, which claims priority to Chinese Patent Application No. 202110904540.2, filed on Aug. 6, 2021. The disclosures of the aforementioned applications are hereby incorporated by reference in their entireties.

TECHNICAL FIELD

The embodiments relate to the communication field, and to a communication method and apparatus.

BACKGROUND

In a 5th generation (5G) new radio (NR) system, three states of a terminal are defined: radio resource control (RRC) connected state, RRC inactive state, and RRC idle state. To position the terminal, a network device may configure an area and a corresponding positioning resource for the terminal, for example, a sounding reference signal (SRS) configuration. The terminal may send an SRS based on the SRS configuration, so that the network device implements positioning.

However, there is currently no effective method for performing positioning-related processing after the terminal moves out of the area.

SUMMARY

Embodiments provide a communication method and apparatus to provide an implementation for positioning processing after a terminal moves out of an area.

The following solutions are used in the embodiments.

According to a first aspect, a communication method is provided. The method includes: a first access network device receives a retrieve user equipment (UE) context request message from a second access network device, and the first access network device sends first information to a positioning management network element. The first information indicates at least one of the following: an area change, update of a sounding reference signal (SRS) configuration, or update of an area. The area is an area in which the SRS configuration configured by the first access network device for a terminal is valid.

It can be understood from the method according to the first aspect that if the first access network device receives the retrieve UE context request message from the second access network device, the first access network device may determine that the terminal has performed reselection to the second access network device, that is, moves out of an area in which the first access network device is located. In this case, the first access network device may send the first information to the positioning management network element, to notify that the area is changed and the SRS configuration needs to be updated. In this way, after the terminal moves out of the area, the positioning management network element can be notified to update the SRS configuration, so that the terminal can continue to be positioned. In addition, when the first access network device receives the retrieve UE context request message from the second access network device, the terminal may be in an inactive state. In this way, the terminal can keep low power consumption while being continuously positioned. This facilitates energy saving.

In a possible solution, one area includes at least one cell. That the first information indicates the area change may include that the first information includes at least one of the following: the area change, moving out of the area, a cell change, moving out of a cell, an area identity, or a cell identity. In this way, the positioning management network element may learn, through the area/cell change or moving out of the area/cell, that the terminal leaves the area, or learn, based on the cell/area identity, that the terminal is in a new area, so as to trigger to request to configure or update the SRS configuration for the terminal. This ensures that the terminal can continue to send an SRS, and ensures positioning continuity.

In a possible solution, that the first information indicates the update of the SRS configuration may include that the first information is used to request to update the SRS configuration, so that the positioning management network element may trigger to request to update the SRS configuration for the terminal.

In a possible solution, that the first information indicates the update of the area may include that the first information is used to request to update the area. In other words, after the terminal performs reselection to the second access network device, the first access network device may request the positioning management network element to reconfigure an area for the terminal, for example, configure, by updating area information, an area including a cell of the second access network device for the terminal, for example, a second area, so that after the terminal leaves the second area, the SRS configuration of the terminal can still be triggered to be updated, to ensure that the terminal can continue to send an SRS, and ensure positioning continuity.

In a possible solution, the first information may be carried in a positioning information update message. In this way, signaling can be multiplexed, so as to improve communication efficiency.

In a possible solution, before the first access network device receives the retrieve UE context request message from the second access network device, the method according to the first aspect may further include: the first access network device receives a first positioning information request message from the positioning management network element, where the first positioning information request message is used to request first positioning information of the terminal. Optionally, the first positioning information includes area information of the area. In this way, the first access network device may send a first positioning information response message to the positioning management network element, where the first positioning information response message may carry the first positioning information of the terminal, to implement positioning of the terminal.

In a possible solution, the retrieve UE context request message carries second information, and the second information indicates at least one of the following: the area change, the update of the SRS configuration, the update of the area, update of positioning information of the terminal, or positioning of the terminal. If the retrieve UE context request message carries the second information, the second access network device can also notify the first access network device of the second information, to trigger the first access network device to send the first information to the positioning management network element as soon as possible. This improves terminal positioning efficiency.

In a possible solution, the area is a positioning area, so that the terminal knows that an SRS can be sent in the area, to implement positioning.

According to a second aspect, a communication method is provided. The method includes: a positioning management network element receives first information from a first access network device, and sends a second positioning information request message to a second access network device. The first information indicates at least one of the following: an area change, update of an SRS configuration, or update of an area, and the area is an area in which the SRS configuration configured by the first access network device for a terminal is valid. The first access network device is an anchor access network device of the terminal, and the second access network device is an access network device on which the terminal currently camps. The second positioning information request message is used to request second positioning information of the terminal.

It should be understood that before the positioning management network element sends the second positioning information request message to the second access network device, the terminal may change from an inactive state to a connected state, and the second access network device is also referred to as a current serving access network device of the terminal.

In a possible solution, that the first information indicates the area change may include that the first information includes at least one of the following: the area change, moving out of the area, a cell change, moving out of a cell, an area identity, or a cell identity, where one area includes at least one cell.

In a possible solution, that the first information indicates the update of the SRS configuration may include that the first information is used to request to update the SRS configuration.

In a possible solution, that the first information indicates the update of the area may include that the first information is used to request to update the area.

In a possible solution, the first information may be carried in a positioning information update message.

In a possible solution, before the positioning management network element receives the first information from the first access network device, the method according to the second aspect may further include: the positioning management network element sends a first positioning information request message to the first access network device, where the first positioning information request message is used to request first positioning information of the terminal. Optionally, the first positioning information includes area information of the area.

Optionally, after the positioning management network element sends the first positioning information request message to the first access network device, the method according to the second aspect may further include: the positioning management network element receives a first positioning information response message from the first access network device, where the first positioning information response message may carry the first positioning information of the terminal.

In a possible solution, after the positioning management network element sends the second positioning information request message to the second access network device, the method according to the second aspect may further include: the positioning management network element receives a second positioning information response message from the second access network device, where the second positioning information response message includes second positioning information of the terminal.

In a possible solution, the area is a positioning area.

In addition, for effects of the method according to the second aspect, refer to the effects of the method according to the first aspect. Details are not described herein again.

According to a third aspect, a communication method is provided. The method includes: a terminal performs reselection to a second access network device from a first access network device, and the terminal sends second information to the second access network device. The first access network device is an anchor access network device of the terminal, and the second access network device is an access network device on which the terminal currently camps. The second information indicates at least one of the following: an area change, update of an SRS configuration, update of an area, update of positioning information of the terminal, or positioning of the terminal. The area is an area in which the SRS configuration configured by the first access network device for the terminal is valid.

It can be understood from the method according to the third aspect that, if the terminal performs reselection to the second access network device, that is, moves out of an area in which the first access network device is located, the terminal may notify the second access network device based on the second information, to trigger the second access network device to obtain context of the terminal as soon as possible.

In a possible solution, the second information is carried in an RRC resume request message to implement signaling multiplexing and reduce communication overheads.

In addition, for effects of the method according to the third aspect, refer to the effects of the method according to the first aspect. Details are not described herein again.

According to a fourth aspect, a communication method is provided. The method includes: a terminal receives third information from a positioning management network element, and sends a provide location information message to the positioning management network element when SRS configuration of the terminal is invalid, an area is changed, or the terminal moves out of an area. The third information indicates a reporting trigger condition, and the reporting trigger condition includes at least one of the following: The SRS configuration of the terminal is invalid, the area is changed, or the terminal moves out of the area. The area is an area in which the SRS configuration of the terminal is valid. In addition, if the area is changed, or the terminal moves out of the area, the SRS configuration of the terminal is invalid. In this case, if the terminal device still needs to send an SRS, the SRS configuration of the terminal needs to be updated.

It can be understood from the method according to the fourth aspect that, the reporting trigger condition is configured for the terminal, so that the terminal can send the provide location information message to the positioning management network element when the SRS configuration is invalid, the area is changed, or the terminal moves out of the area, so that the positioning management network element can trigger update of the SRS configuration of the terminal, and after the terminal moves out of the area, the terminal can continue to send the SRS by updating the SRS configuration, so that the terminal can continue to be positioned.

In a possible solution, the provide location information message may include first information, where the first information includes at least one of the following: the area change, moving out of the area, a cell change, moving out of a cell, an area identity, or a cell identity, where one area includes at least one cell. In this way, the positioning management network element may learn, based on the first information, for example, through the area/cell change or moving out of the area/cell, that the terminal leaves the area, or learn, based on the cell/area identity, that the terminal is in a new area, so as to trigger to request to configure or update an SRS configuration for the terminal. This ensures that the terminal can continue to send the SRS, and ensures positioning continuity.

Optionally, after the terminal sends the provide location information message to the positioning management network element, the method according to the third aspect may further include: the terminal receives an SRS configuration from a second access network device, where the second access network device is an access network device on which the terminal camps or a serving access network device.

In a possible solution, the third information may be carried in a request location information message. In this way, signaling can be multiplexed, so as to improve communication efficiency.

In a possible solution, before the terminal sends the provide location information message to the positioning management network element, the method according to the third aspect may further include: the terminal receives fourth information from the positioning management network element, where the fourth information includes area information of the area, and the area information includes at least one of the following: an area identity of the area or a cell list of the area. In this way, the terminal may learn, based on the fourth information, a valid area in which the terminal sends the SRS, so that when moving in the area (moving between cells in the area), the terminal may continuously send the SRS. This ensures positioning continuity in the area.

Optionally, the fourth information may be carried in the request location information message. In this way, signaling can be multiplexed, so as to improve communication efficiency. In addition, the fourth information and the third information may be in a same message, or may be in different messages. This is not limited.

In a possible solution, the area is a positioning area.

In addition, for other effects of the method according to the fourth aspect, refer to the effects of the method according to the first aspect. Details are not described herein again.

According to a fifth aspect, a communication method is provided. The method includes: a positioning management network element sends third information to a terminal, and receives a provide location information message from the terminal. The third information indicates a reporting trigger condition, and the reporting trigger condition includes at least one of the following: An SRS configuration of the terminal is invalid, an area is changed, or the terminal moves out of an area. The area is an area in which the SRS configuration of the terminal is valid. In addition, if the area is changed, or the terminal moves out of the area, the SRS configuration of the terminal is invalid. In this case, if the terminal device still needs to send an SRS, the SRS configuration of the terminal needs to be updated.

In a possible solution, the provide location information message may include first information, where the first information includes at least one of the following: the area change, moving out of the area, a cell change, moving out of a cell, an area identity, or a cell identity, where one area includes at least one cell.

In a possible solution, the third information may be carried in a request location information message.

In a possible solution, before the positioning management network element receives the provide location information message from the terminal, the method according to the fourth aspect may further include: the positioning management network element sends fourth information to the terminal, where the fourth information includes area information, and the area information includes at least one of the following: the area identity of the area or a cell list of the area.

In a possible solution, the fourth information may be carried in a request location information message, and the fourth information and the third information may be in a same message, or may be in different messages. This is not limited.

In a possible solution, the area is a positioning area.

In addition, for effects of the method according to the fifth aspect, refer to the effects of the methods according to the first aspect and the third aspect. Details are not described herein again.

According to a sixth aspect, a communication apparatus is provided. The apparatus includes a receiving module and a sending module. The receiving module is configured to receive a retrieve UE context request message from a second access network device. The sending module is configured to send first information to a positioning management network element. The first information indicates at least one of the following: an area change, update of a sounding reference signal (SRS) configuration, or update of an area. The area is an area in which the SRS configuration configured by the first access network device for a terminal is valid.

In a possible solution, one area includes at least one cell. That the first information indicates the area change may include that the first information includes at least one of the following: the area change, moving out of the area, a cell change, moving out of a cell, an area identity, or a cell identity.

In a possible solution, that the first information indicates the update of the SRS configuration may include that the first information is used to request to update the SRS configuration.

In a possible solution, that the first information indicates the update of the area may include that the first information is used to request to update the area.

In a possible solution, the first information may be carried in a positioning information update message.

In a possible solution, the receiving module may be further configured to: before receiving the retrieve UE context request message from the second access network device, receive a first positioning information request message from the positioning management network element, where the first positioning information request message is used to request first positioning information of the terminal. Optionally, the first positioning information includes area information of the area.

Optionally, the sending module may be further configured to: after the receiving module receives the first positioning information request message from the positioning management network element, send a first positioning information response message to the positioning management network element, where the first positioning information response message may carry the first positioning information of the terminal.

In a possible solution, the retrieve UE context request message carries second information, and the second information indicates at least one of the following: the area change, the update of the SRS configuration, the update of the area, update of positioning information of the terminal, or positioning of the terminal.

In a possible solution, the area is a positioning area.

Optionally, the sending module and the receiving module may be integrated into one module, for example, a transceiver module. The transceiver module is configured to implement a sending function and a receiving function of the apparatus according to the sixth aspect.

Optionally, the apparatus according to the sixth aspect may further include a processing module. The processing module is configured to implement a processing function of the apparatus.

Optionally, the apparatus according to the sixth aspect may further include a storage module, and the storage module stores a program or instructions. When the processing module executes the program or the instructions, the apparatus can perform the method according to the first aspect.

It should be noted that the apparatus according to the sixth aspect may be a network device, for example, a first access network device, may be a chip (system) or another part or component that may be disposed in a network device, or may be an apparatus including a network device. This is not limited.

In addition, for effects of the apparatus according to the sixth aspect, refer to the effects of the method according to the first aspect. Details are not described herein again.

According to a seventh aspect, a communication apparatus is provided. The apparatus includes a receiving module and a sending module. The receiving module is configured to receive first information from a first access network device. The sending module is configured to send a second positioning information request message to a second access network device. The first information indicates at least one of the following: an area change, update of an SRS configuration, or update of an area, and the area is an area in which the SRS configuration configured by the first access network device for a terminal is valid. The first access network device is an anchor access network device of the terminal, the second access network device is an access network device on which the terminal currently camps, and the second positioning information request message is used to request second positioning information of the terminal.

It should be understood that before a positioning management network element sends the second positioning information request message to the second access network device, the terminal may change from an inactive state to a connected state, and the second access network device is also referred to as a current serving access network device of the terminal.

In a possible solution, that the first information indicates the area change may include that the first information includes at least one of the following: the area change, moving out of the area, a cell change, moving out of a cell, an area identity, or a cell identity, where one area includes at least one cell.

In a possible solution, that the first information indicates the update of the SRS configuration may include that the first information is used to request to update the SRS configuration.

In a possible solution, that the first information indicates the update of the area may include that the first information is used to request to update the area.

In a possible solution, the first information may be carried in a positioning information update message.

In a possible solution, the sending module may be further configured to: before the receiving module receives the first information from the first access network device, send a first positioning information request message to the first access network device, where the first positioning information request message is used to request first positioning information of the terminal. Optionally, the first positioning information includes area information of the area.

Optionally, the receiving module may be further configured to: after the sending module sends the first positioning information request message to the first access network device, receive a first positioning information response message from the first access network device, where the first positioning information response message may carry the first positioning information of the terminal.

In a possible solution, the receiving module may be further configured to: after the sending module sends the second positioning information request message to the second access network device, receive a second positioning information response message from the second access network device, where the second positioning information response message includes the second positioning information of the terminal.

In a possible solution, the area is a positioning area.

Optionally, a sending module and a receiving module may be integrated into one module, for example, a transceiver module. The transceiver module is configured to implement a sending function and a receiving function of the apparatus according to the seventh aspect.

Optionally, the apparatus according to the seventh aspect may further include a processing module. The processing module is configured to implement a processing function of the apparatus.

Optionally, the apparatus according to the seventh aspect may further include a storage module, and the storage module stores a program or instructions. When the processing module executes the program or the instructions, the apparatus can perform the method according to the second aspect.

It should be noted that the apparatus according to the seventh aspect may be a network device, for example, a positioning management network element, may be a chip (system) or another part or component that may be disposed in a network device, or may be an apparatus including a network device. This is not limited.

In addition, for effects of the apparatus according to the seventh aspect, refer to the effects of the method according to the second aspect. Details are not described herein again.

According to an eighth aspect, a communication apparatus is provided. The apparatus includes a transceiver module and a processing module. The processing module is configured to reselect the communication apparatus from a first access network device to a second access network device. The transceiver module is configured to send second information to the second access network device. The first access network device is an anchor access network device of the communication apparatus, and the second access network device is an access network device on which the communication apparatus currently camps. The second information indicates at least one of the following: an area change, update of an SRS configuration, update of an area, update of positioning information of the apparatus, or positioning of the apparatus. The area is an area in which the SRS configuration configured by the first access network device for the communication apparatus is valid.

In a possible solution, the second information is carried in an RRC resume request message.

Optionally, the transceiver module may also include a sending module and a receiving module. The sending module is configured to implement a sending function of the apparatus according to the eighth aspect, and the receiving module is configured to implement a receiving function of the apparatus according to the eighth aspect.

Optionally, the apparatus according to the eighth aspect may further include a storage module, and the storage module stores a program or instructions. When the processing module executes the program or the instructions, the apparatus can perform the method according to the third aspect.

It should be noted that the apparatus according to the eighth aspect may be a terminal, may be a chip (system) or another part or component that may be disposed in a terminal, or may be an apparatus including a terminal. This is not limited.

In addition, for effects of the apparatus according to the eighth aspect, refer to the effects of the method according to the third aspect. Details are not described herein again.

According to a ninth aspect, a communication apparatus is provided. The apparatus includes a transceiver module and a processing module. The transceiver module is configured to receive third information from a positioning management network element. The processing module is configured to control the transceiver module to send a provide location information message to the positioning management network element when an SRS configuration of the apparatus is invalid, an area is changed, or the apparatus moves out of an area. The third information indicates a reporting trigger condition, and the reporting trigger condition includes at least one of the following: The SRS configuration of the apparatus is invalid, the area is changed, or the apparatus moves out of the area. The area is an area in which the SRS configuration of the apparatus is valid. In addition, if the area is changed, or the apparatus moves out of the area, the SRS configuration of the apparatus is invalid. In this case, if the apparatus still needs to send an SRS, the SRS configuration of the apparatus needs to be updated.

In a possible solution, the provide location information message may include first information, where the first information includes at least one of the following: the area change, moving out of the area, a cell change, moving out of a cell, an area identity, or a cell identity, where one area includes at least one cell.

Optionally, the transceiver module may be further configured to: after sending the provide location information message to the positioning management network element, receive an SRS configuration from a second access network device, where the second access network device is an access network device on which the apparatus according to the ninth aspect camps or a serving access network device.

In a possible solution, the third information may be carried in a request location information message.

In a possible solution, the transceiver module may be further configured to: before sending the provide location information message to the positioning management network element, receive fourth information from the positioning management network element, where the fourth information includes area information, and the area information includes at least one of the following: the area identity of the area or a cell list of the area.

Optionally, the fourth information may be carried in a request location information message. In addition, the fourth information and the third information may be in a same message, or may be in different messages. This is not limited.

In a possible solution, the area is a positioning area.

Optionally, the transceiver module may include a receiving module and a sending module. The receiving module is configured to implement a receiving function of the apparatus according to the ninth aspect, and the sending module is configured to implement a sending function of the apparatus according to the ninth aspect.

Optionally, the apparatus according to the ninth aspect may further include a storage module, and the storage module stores a program or instructions. When the processing module executes the program or the instructions, the apparatus can perform the method according to the fourth aspect.

It should be noted that the apparatus according to the ninth aspect may be a terminal, may be a chip (system) or another part or component that may be disposed in a terminal, or may be an apparatus including a terminal. This is not limited.

In addition, for effects of the apparatus according to the ninth aspect, refer to the effects of the method according to the fourth aspect. Details are not described herein again.

According to a tenth aspect, a communication apparatus is provided. The apparatus includes a receiving module and a sending module. The sending module is configured to send third information to a terminal. The receiving module is configured to receive a provide location information message from the terminal. The third information indicates a reporting trigger condition, and the reporting trigger condition includes at least one of the following: An SRS configuration of the terminal is invalid, an area is changed, or the terminal moves out of an area. The area is an area in which the SRS configuration of the terminal is valid. In addition, if the area is changed, or the terminal moves out of the area, the SRS configuration of the terminal is invalid. In this case, if the terminal device still needs to send an SRS, the SRS configuration of the terminal needs to be updated.

In a possible solution, the provide location information message may include first information, where the first information includes at least one of the following: the area change, moving out of the area, a cell change, moving out of a cell, an area identity, or a cell identity, where one area includes at least one cell.

In a possible solution, the third information may be carried in a request location information message.

In a possible solution, the sending module may be further configured to: before the receiving module receives the provide location information message from the terminal, send fourth information to the terminal, where the fourth information includes area information, and the area information includes at least one of the following: the area identity of the area or a cell list of the area.

In a possible solution, the fourth information may be carried in a request location information message, and the fourth information and the third information may be in a same message, or may be in different messages. This is not limited.

In a possible solution, the area is a positioning area.

Optionally, the sending module and the receiving module may be integrated into one module, for example, a transceiver module. The transceiver module is configured to implement a sending function and a receiving function of the apparatus according to the tenth aspect.

Optionally, the apparatus according to the tenth aspect may further include a processing module. The processing module is configured to implement a processing function of the apparatus.

Optionally, the apparatus according to the tenth aspect may further include a storage module, and the storage module stores a program or instructions. When the processing module executes the program or the instructions, the apparatus can perform the method according to the fifth aspect.

It should be noted that the apparatus according to the tenth aspect may be a network device, for example, a positioning management network element, may be a chip (system) or another part or component that may be disposed in a network device, or may be an apparatus including a network device. This is not limited.

In addition, for effects of the apparatus according to the tenth aspect, refer to the effects of the method according to the fifth aspect. Details are not described herein again.

According to an eleventh aspect, a communication apparatus is provided. The apparatus includes a processor. The processor is configured to perform the method according to any one of the first aspect to the fifth aspect.

In a possible solution, the apparatus according to the eleventh aspect may further include a transceiver. The transceiver may be a transceiver circuit or an interface circuit. The transceiver may be configured for the apparatus to communicate with another apparatus.

In a possible solution, the apparatus according to the eleventh aspect may further include a memory. The memory and the processor may be integrated together, or may be disposed separately. The memory may be configured to store a computer program and/or data related to the method according to any one of the first aspect to the fifth aspect.

In the embodiments, the apparatus according to the eleventh aspect may be the network device according to the first aspect, the second aspect, or the fifth aspect, the terminal according to the third aspect or the fourth aspect, a chip (system) or another part or component that may be disposed in the terminal or the network device, or an apparatus including the terminal or the network device.

In addition, for effects of the apparatus according to the eleventh aspect, refer to effects of the method according to any one of the first aspect to the fifth aspect. Details are not described herein again.

According to a twelfth aspect, a communication apparatus is provided. The apparatus includes a processor and a memory. The memory is configured to store computer instructions, and when the processor executes the instructions, the apparatus is enabled to perform the method according to any one of the first aspect to the fifth aspect.

In a possible solution, the apparatus according to the twelfth aspect may further include a transceiver. The transceiver may be a transceiver circuit or an interface circuit. The transceiver may be configured for the apparatus to communicate with another apparatus.

In the embodiments and solutions, the apparatus according to the twelfth aspect may be the network device according to the first aspect, the second aspect, or the fifth aspect, the terminal according to the third aspect or the fourth aspect, a chip (system) or another part or component that may be disposed in the terminal or the network device, or an apparatus including the terminal or the network device.

In addition, for effects of the apparatus according to the twelfth aspect, refer to effects of the method according to any one of the first aspect to the fifth aspect. Details are not described herein again.

According to a thirteenth aspect, a communication apparatus is provided. The apparatus includes a logic circuit and an input/output interface. The input/output interface is configured to receive code instructions and transmit the code instructions to the logic circuit. The logic circuit is configured to run the code instructions to perform the method according to any one of the first aspect to the fifth aspect.

In a possible solution, the apparatus according to the thirteenth aspect may further include a transceiver. The transceiver may be a transceiver circuit or an interface circuit. The transceiver may be configured for the apparatus to communicate with another apparatus.

In a possible solution, the apparatus according to the thirteenth aspect may further include a memory. The memory and a processor may be integrated together, or may be disposed separately. The memory may be configured to store a computer program and/or data related to the method according to any one of the first aspect to the fifth aspect.

In the embodiments and solutions, the apparatus according to the twelfth aspect may be the network device according to the first aspect, the second aspect, or the fifth aspect, the terminal according to the third aspect or the fourth aspect, a chip (system) or another part or component that may be disposed in the terminal or the network device, or an apparatus including the terminal or the network device.

In addition, for effects of the apparatus according to the thirteenth aspect, refer to effects of the method according to any one of the first aspect to the fifth aspect. Details are not described herein again.

According to a fourteenth aspect, a communication apparatus is provided. The apparatus includes a processor and a transceiver. The transceiver is configured to exchange information between the communication apparatus and another apparatus, and the processor executes program instructions to perform the method according to any one of the first aspect to the fifth aspect.

In a possible solution, the apparatus according to the fourteenth aspect may further include a memory. The memory and the processor may be integrated together, or may be disposed separately. The memory may be configured to store a computer program and/or data related to the method according to any one of the first aspect to the fifth aspect.

In the embodiments and solutions, the apparatus according to the fourteenth aspect may be the network device according to the first aspect, the second aspect, or the fifth aspect, the terminal according to the third aspect or the fourth aspect, a chip (system) or another part or component that may be disposed in the terminal or the network device, or an apparatus including the terminal or the network device.

In addition, for effects of the apparatus according to the fourteenth aspect, refer to effects of the method according to any one of the first aspect to the fifth aspect. Details are not described herein again.

According to a fifteenth aspect, a communication system is provided. The communication system includes the network device according to the first aspect, the second aspect, or the fifth aspect, for example, the first access network device and the positioning management network element, and includes the terminal in the method according to the third aspect or the fourth aspect.

According to a sixteenth aspect, a non-transitory computer-readable storage medium is provided, including a computer program. When the computer program is run on a computer, the method according to any one of the first aspect to the fifth aspect is enabled to be performed.

According to a seventeenth aspect, a computer program product is provided, including a computer program. When the computer program or instructions are run on a computer, the method according to any one of the first aspect to the fifth aspect is enabled to be performed.

DETAILED DESCRIPTION OF EMBODIMENTS

The following describes terms in the embodiments.

1. Network Architecture

Figures 1, 2:
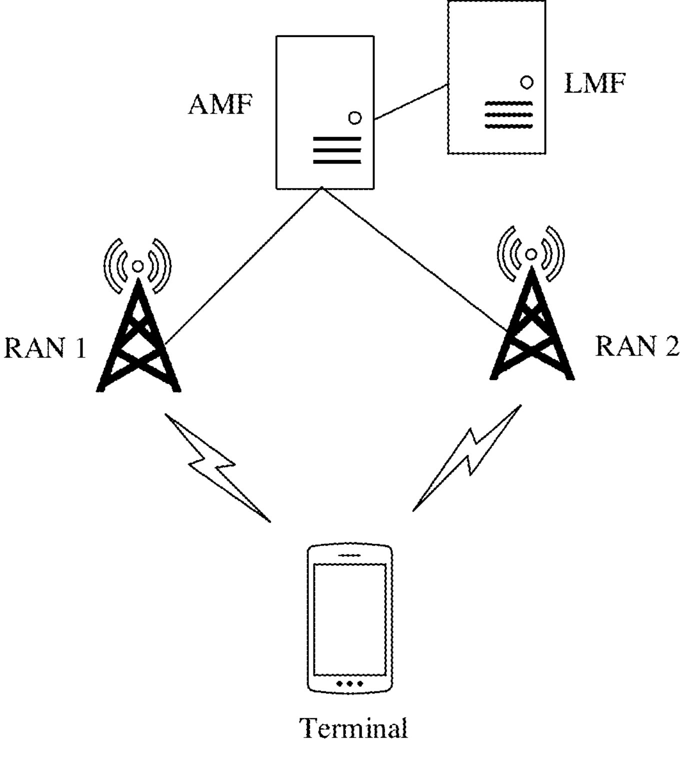
FIG. 1 is a schematic diagram of a network architecture.
FIG. 2 is a schematic diagram of state switching of a terminal.

Refer to FIG. 1. FIG. 1 is an example architectural diagram of a network according to the embodiments. The network includes a radio access network (RAN) device, also referred to as an access network device, an access and mobility management function (AMF) entity, a location management function (LMF) network element, and a terminal, for example, user equipment (UE).

There may be a plurality of RAN devices, for example, a RAN device 1 and a RAN device 2, configured to provide a network access function for a terminal in a specific area, and can use transmission tunnels of different quality based on a level of the terminal, a service requirement, and the like. The RAN device can manage a radio resource, provide an access service for the terminal, and forward a control signal and terminal data between the terminal and a network. The RAN device may include, but is not limited to: a gNB in a 5G system, for example, an NR system, or one antenna panel or a group of antenna panels (including a plurality of antenna panels) of a base station in a 5G system, or may be a network node that forms a gNB, a transmission point (transmission and reception point, TRP, or transmission point, TP), or a transmission measurement function (TMF), for example, a baseband unit (BBU), a central unit (CU), a distributed unit (DU), a road side unit (RSU) that has a base station function, or a wired access gateway. In a future positioning network, the RAN device may still be a RAN device, or may have another name. This is not limited. In addition, the RAN device may also include an access point (AP), a wireless relay node, a wireless backhaul node, macro base stations in various forms, micro base stations (also referred to as small stations), a relay station, an access point, a wearable device, and a vehicle-mounted device in a wireless fidelity (wireless fidelity, Wi-Fi) system.

The AMF entity is configured to implement an access and mobility management function, for example, manage access control and mobility of a terminal.

The LMF network element is configured to implement functions such as positioning. The LMF network element is an apparatus or a component that is deployed in a core network and that provides a positioning function for a terminal, and may be configured to determine a location of the terminal. In the embodiments, the LMF network element may be replaced with another apparatus or component that provides the positioning function for the terminal. In a future positioning network, for example, in 6G, the LMF network element may still be an LMF network element, or may have another name. This is not limited.

The terminal is a terminal that accesses the positioning network and has a wireless transceiver function, or a chip or a chip system that may be disposed in the terminal. The terminal may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal in embodiments may be a mobile phone, a tablet computer (pad), a computer having a wireless transceiver function, a virtual reality (VR) terminal, an augmented reality (augmented reality, AR) terminal, a wireless terminal in industrial control, a wireless terminal in self driving, a wireless terminal in remote medical, a wireless terminal in a smart grid (smart grid), a wireless terminal in transportation safety, a wireless terminal in a smart city, a wireless terminal in a smart home, a vehicle-mounted terminal, an RSU having a terminal function, or the like. The terminal may alternatively be a vehicle-mounted module, a vehicle-mounted assembly, a vehicle-mounted component, a vehicle-mounted chip, or a vehicle-mounted unit that is built in a vehicle as one or more components or units.

The terminal may access a network by using the RAN device, and communicate with the AMF network element and the LMF network element. In addition, in a network access and communication process, a status of the terminal may be switched between an RRC connected state, an RRC idle state, and an RRC inactive state. For details, refer to related descriptions in FIG. 2.

It should be noted that the RAN device may be an access network device described below, for example, a first access network device or a second access network device, the LMF network element may be a positioning management network element described below, and the terminal is a terminal described below. Therefore, for related functions implemented by the access network device, the positioning management network element, and the terminal below, refer to related descriptions in the network architecture shown in FIG. 1. Details are not described one by one in the following.

2. RRC Connected State

The RRC connected state is a state in which a terminal establishes a connection to a network. In the RRC connected state, there is an RRC connection between a RAN device and a terminal, and a unicast message can be sent through the RRC connection. The RAN device establishes a connection between the RAN device and a core network element such as an AMF network element for the terminal, and the RAN device stores context of the terminal.

3. RRC Idle State

The RRC idle state is a state in which no connection is established between a terminal and a network. In the RRC idle state, no RRC connection is established between a RAN device and a terminal, the RAN device does not establish a connection between the RAN device and a core network element for the terminal, and the RAN device does not store context of the terminal. In the RRC idle state, the terminal may receive a broadcast message of the RAN device and a paging message of a core network, so that the terminal restores from the RRC idle state to an RRC connected state.

4. RRC Inactive State

The RRC inactive state, also referred to as a third state, is a state in which establishment of a connection between a terminal and a network is suspended. In the RRC inactive state, an RRC connection between a RAN device and a terminal is suspended, so as to save energy of the terminal. The RAN device establishes a connection between the RAN device and a core network for the terminal, stores context of the terminal, and knows a RAN device to which the terminal belongs. The terminal may receive a broadcast message of the RAN device and a paging message of the core network, so that the terminal can quickly restore the RRC connected state, that is, quickly restore an RRC connection to the RAN device, or be released to an RRC idle state.

For ease of understanding, the RRC connected state is described as a connected state, the RRC inactive state is described as an inactive state, and the RRC idle state is described as an idle state below. Unless otherwise specified, a connected state in the following may also be understood as an RRC connected state, an inactive state may also be understood as an RRC inactive state, and an idle state may also be understood as an RRC idle state.

The solutions in embodiments are not limited to the network architecture shown in FIG. 1, and may be further applied to various communication systems, for example, a wireless fidelity (Wi-Fi) system, a vehicle-to-everything (V2X) communication system, a device-to-device (D2D) communication system, an Internet of vehicles communication system, a 4th generation (, 4G) mobile communication system like a long term evolution LTE system, a 5G mobile communication system like an NR system, and a future communication system like a 6th generation (6G) mobile communication system.

All aspects, embodiments, or features are presented in the embodiments by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments, words such as “example” or “for example” are used to indicate an example, an instance, or descriptions. Any embodiment or design scheme described as an “example” should not be explained as being more preferred or having more advantages than another embodiment or design scheme. To be exact, use of the word “example” is intended to present a concept in a specific manner.

In embodiments, terms “information”, “signal”, “message”, “channel”, and “signaling” may sometimes be interchangeably used. It should be noted that meanings expressed by the terms are consistent when differences of the terms are not emphasized. “Of”, “relevant (corresponding or relevant) ”, and “corresponding” may be interchangeably used sometimes. It should be noted that expressed meanings are consistent when differences are not emphasized.

The network architecture and the service scenario described in embodiments are intended to describe the solutions in embodiments more clearly, and do not constitute a limitation on the solutions provided. A person of ordinary skill in the art may know that: with the evolution of the network architecture and the emergence of new service scenarios, the solutions provided in embodiments are also applicable to similar problems.

With reference to FIG. 3 to FIG. 7, the following describes in detail the communication method provided in embodiments.

Figure 3:
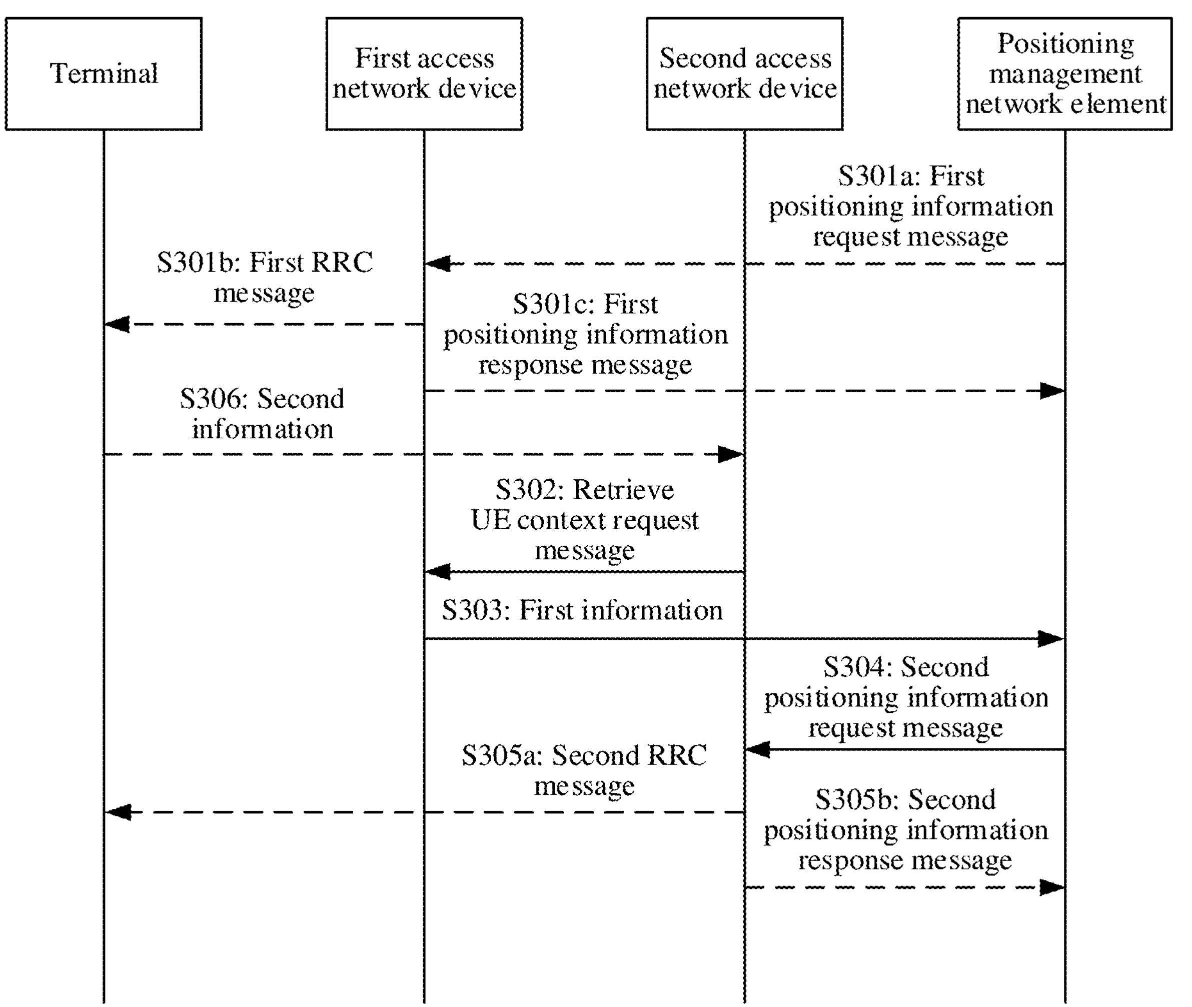
FIG. 3 is a schematic flowchart 1 of a communication method according to an embodiment.

For example, FIG. 3 is a schematic flowchart 1 of a communication method according to an embodiment. The communication method may be applied to communication between a terminal, an access network device such as a first access network device (a RAN device 1) and a second access network device (a RAN device 2), and a positioning management network element (an LMF network element) in the network architecture shown in FIG. 1. As shown in FIG. 3, the communication method includes S302, S303, and S304.

S302: The second access network device sends a retrieve UE context request (retrieve UE context request) message to the first access network device, and the first access network device receives the retrieve UE context request message from the second access network device.

The first access network device may be an anchor access network device of the terminal. The anchor access network device may be an access network device that releases the terminal to an inactive state, or an access network device that stores context of the terminal in an inactive state. Optionally, for a terminal in a connected state, if the first access network device determines that the terminal does not send or receive data or does not have a data service in a period of time, the first access network device may send a first RRC release message to the terminal, to release the terminal from the connected state to an inactive state, and store context of the terminal. In this case, the first access network device network element is used as an anchor access network device of the terminal.

The second access network device may be an access network device on which the terminal currently camps. Optionally, with movement of the terminal, the terminal may perform cell reselection, that is, perform reselection to a cell with a stronger signal intensity. For example, the terminal performs reselection to the second access network device from the first access network device, and the second access network device is used as an access network device on which the terminal currently camps.

The retrieve UE context request message is used by the second access network device to request the context of the terminal. Optionally, after the terminal performs reselection to the second access network device, if the terminal needs to restore a network connection, or a network needs to page the terminal to the connected state, the terminal may send an RRC resume request (RRC resume request) message to the second access network device, to request to restore the connection state. Alternatively, the terminal may send an RRC resume request for another reason, for example, RAN notification area-update (rna-update) or positioning area update. The RRC resume request message may carry an identifier allocated by the first access network device to the terminal, for example, an inactive-radio network temporary identifier (I-RNTI). The second access network device may send the retrieve UE context request message to the first access network device based on the identifier, so that the first access network device sends a retrieve UE context response message to the second access network device, where the retrieve UE context response message carries the context of the terminal.

It should be noted that, after the terminal performs reselection to the second access network device, if the terminal needs to perform early data transmission, the terminal may also send the RRC resume request message to the second access network device, where the RRC resume request message carries or is accompanied by small data (SD) that needs to be transmitted by the terminal. In other words, in this case, the terminal does not request to restore the connected state, but multiplexes RRC signaling to implement small data transfer (SDT).

S303: The first access network device sends first information to the positioning management network element, and the positioning management network element receives the first information from the first access network device.

The first information indicates at least one of the following: an area change, update of an SRS configuration, or update of an area. The first information may be carried in a positioning information update message. In this way, signaling can be multiplexed, so as to improve communication efficiency. Additionally, the first information may alternatively be carried in another appropriate message.

Figure 4:
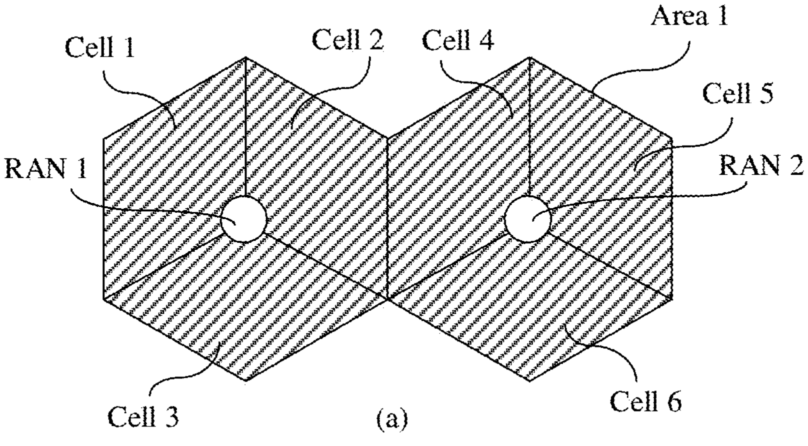
FIG. 4 is a schematic diagram 1 of a structure of a cell/area in a communication method according to an embodiment.
Figure 4:
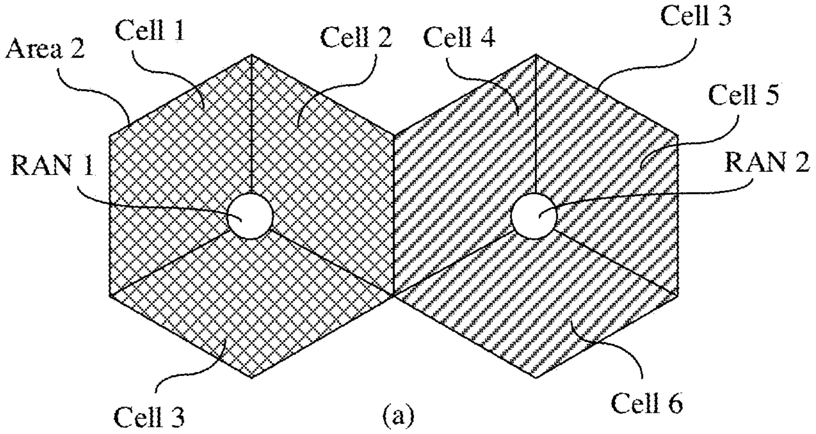
Figure 5:
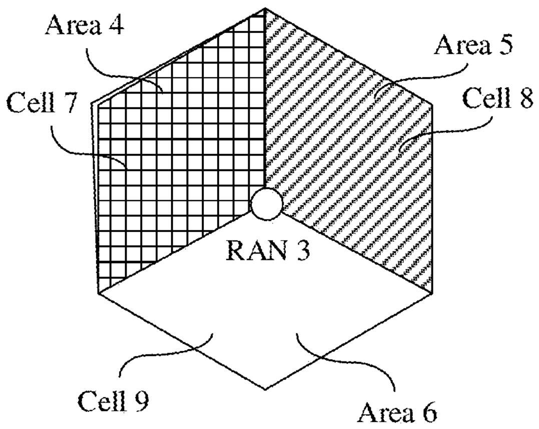
FIG. 5 is a schematic diagram 2 of a structure of a cell/area in a communication method according to an embodiment.

The area includes a cell of at least one access network device, that is, one area includes at least one cell. For example, the area may include a cell of the first access network device, that is, the area is an area including the cell of the first access network device, or may be understood as an area in which the first access network device is located. For ease of description, the area is collectively referred to as an area in which the first access network device is located in the following. Optionally, the area may further include a cell of a neighboring access network device of the first access network device. For example, as shown in FIG. 4, cells of the RAN device 1 include a cell 1, a cell 2, and a cell 3, and cells of the RAN device 2 include a cell 4, a cell 5, and a cell 6. As shown in (a) in FIG. 4, an area 1 (a diagonal area) includes the cell 1, the cell 2, the cell 3, the cell 4, the cell 5, and the cell 6, and the area 1 includes the cells of the RAN device 1 and also includes the cells of the RAN device 2. Alternatively, as shown in (b) in FIG. 4, an area 2 (a grid area) includes the cell 1, the cell 2, and the cell 3, an area 3 (a diagonal area) includes the cell 4, the cell 5, and the cell 6, the area 2 includes the cells of the RAN device 1, and the area 3 includes the cells of the RAN device 2. Therefore, the area 2 may be understood as an area in which the RAN device 1 is located, and the area 3 may be understood as an area in which the RAN device 2 is located. For another example, as shown in FIG. 5, cells of a RAN device 3 include a cell 7, a cell 8, and a cell 9. An area 4 (a grid area) includes the cell 7, an area 5 (a diagonal area) includes the cell 8, and an area 6 includes the cell 9. It can be understood that the RAN device has a plurality of cells, one area may include a plurality of cells of one RAN device, or there are a plurality of RAN devices, and one area includes cells of a plurality of RAN devices. In other words, the area is a set of a plurality of cells, such as a cell set. However, one area may alternatively include only some cells of a RAN device, for example, one cell. If one area includes only one cell, the area is a cell. Therefore, the cell mentioned below may be a cell in the area, or may be the area itself. This is not limited herein.

If the terminal is located in an area in which the first access network device is located, for the terminal, the area may be an area in which an SRS configuration configured by the first access network device for the terminal is valid. The SRS configuration is used by the terminal to send an SRS. Therefore, the area is also an area in which the terminal may send the SRS based on the SRS configuration. In other words, if the terminal is in the area, the SRS configuration configured by the first access network device for the terminal is valid, and the terminal may send the SRS based on the SRS configuration, to implement positioning of the terminal in the area. If the terminal leaves the area, the SRS configuration configured by the first access network device for the terminal is invalid, and the terminal cannot send the SRS based on the SRS configuration, thereby failing to implement positioning. For example, the area is a first area. The first access network device configures, for the terminal, an SRS configuration corresponding to the first area, for example, a first SRS configuration. If the terminal is in the first area, the first SRS configuration is valid, and the terminal may send a first SRS based on the first SRS configuration. If the terminal leaves the first area, for example, moves from the first area to a second cell or a second area different from the first area, the first SRS configuration is invalid, that is, in the second cell or the second area, the terminal cannot send the first SRS based on the first SRS configuration. It may be understood that, because the area is an area in which the terminal may send the SRS, and the SRS is used for positioning of the terminal, the area may alternatively be a positioning area, so that the terminal knows that the SRS may be sent in the area, so as to implement positioning.

Optionally, before S302, the first access network device may configure the SRS configuration for the terminal, and a configuration manner includes S301*a* to S301*c*.

S301*a*: The positioning management network element sends a first positioning information request (positioning information request) message to the first access network device, and the first access network device receives the first positioning information request message from the positioning management network element.

The first positioning information request message may be used to request first positioning information of the terminal, and the first positioning information may include the SRS configuration configured by the first access network device for the terminal. The SRS configuration is used by the terminal to send the SRS, for example, including a bandwidth and a cycle required for sending the SRS. In addition, optionally, the first positioning information further includes any other information related to positioning of the terminal, for example, area information of the area, such as area information of an area in which the first access network device is located. For specific implementations, refer to related descriptions in the following.

For example, before the terminal performs reselection to the second access network device, for example, when the terminal camps on the first access network device, or when the first access network device provides a service for the terminal, the terminal may send a provide capability message to the positioning management network element, so that the positioning management network element learns a capability of the terminal, for example, a capability of the SRS, and sends the first positioning information request message to the first access network device. Optionally, the first positioning information request message may be sent to the first access network device through an AMF entity.

S301*b*: The first access network device sends a first RRC message to the terminal, and the terminal receives the first RRC message from the first access network device.

The first access network device may determine the SRS configuration of the terminal based on the first positioning information request message, so as to send the SRS configuration to the terminal based on the first RRC message. The first RRC message may be a first RRC reconfiguration message or the first RRC release message. If the first RRC message is the first RRC release message, the terminal is released to the inactive state while the SRS configuration is configured for the terminal. In this way, signaling overheads can be reduced.

S301c: The first access network device sends a first positioning information response message to the positioning management network element, and the positioning management network element receives the first positioning information response message from the first access network device.

The first positioning information response message carries the SRS configuration. The positioning management network element may send the SRS configuration to a neighboring access network device of the first access network device. There may be a plurality of neighboring access network devices, for example, three or four neighboring access network devices. This is not limited herein. In this way, the terminal may send the SRS based on the SRS configuration. Correspondingly, the neighboring access network device may receive the SRS based on the SRS configuration, that is, receive the SRS at a specified time-frequency location, and determine a measurement result corresponding to the SRS, for example, a relative time of arrival (RTOA) or an uplink-angle of arrival (UL-AOA) of the SRS. The neighboring access network device may send the measurement result to the positioning management network element, so that the positioning management network element determines a location of the terminal based on the measurement result, such as the UL-RTOA or the UL-AOA of the SRS, to implement positioning of the terminal in an area in which the first access network device is located. In addition, an execution sequence of S301*b* and S301*c* is not limited.

It may be understood that, before the terminal performs reselection to the second access network device, the first access network device performs communication interaction with a corresponding positioning management network element. In this way, after the terminal performs reselection to the second access network device, the first access network device may accurately send the first information to the corresponding positioning management network element, to avoid incorrect sending, for example, sending the first information to another network element.

Optionally, before S302, the first access network device may further configure the area information of the area for the terminal, such as the area information of the area in which the first access network device is located, for example, first area information. A configuration manner includes carrying the first area information in the first RRC message. Optionally, the first area information may be alternatively carried in the first positioning information response message.

The area information may include at least one of the following: an area identity (referred to as a first area identity below for ease of description) of the area in which the first access network device is located, or a cell list (referred to as a first cell list below for ease of description) of the area in which the first access network device is located. The first area identity may be an identifier (ID) of the area, or may be any other identity. This is not limited herein. The first cell list may include cell identities of all cells in the area in which the first access network device is located. For example, as shown in (a) in FIG. 4, the cell list may be the area 1 {the cell 1, the cell 2, the cell 3, the cell 4, the cell 5, the cell 6}. As shown in (b) in FIG. 4, the cell list may be the area 2 {the cell 1, the cell 2, the cell 3} or the area 3 {the cell 4, the cell 5, the cell 6}. For another example, as shown in FIG. 5, the cell list may be the area 4 {the cell 7}, the area 5 {the cell 8}, or the area 6 {the cell 9}. The SRS configuration is valid in the area indicated by the first area identity or the first cell list, that is, the SRS configuration is valid in the area in which the first access network device is located. For example, when the terminal moves in the area indicated by the first area identity or the first cell list, the SRS configuration is valid, and the terminal may continuously send the SRS. This ensures positioning continuity. The terminal may determine whether a cell identity of a cell in which the terminal is currently located corresponds to the first area identity or the first cell list, so as to determine whether the terminal is in the area indicated by the area identity. Alternatively, the terminal may obtain an area identity broadcast by an access network device, and determine whether the broadcast area identity corresponds to the first area identity or the first cell list, to determine whether the terminal is in the area indicated by the area identity. In addition, the area in which the first access network device is located may be an area corresponding to a plurality of area identities, and the SRS configuration is valid in the area corresponding to the plurality of area identities. The first area identity and the first cell list and the SRS configuration configured by the first access network device for the terminal may be carried in a same RRC message, or may be carried in different RRC messages. This is not limited herein.

It should be noted that the manner in which the first access network device configures the SRS configuration and/or the area information is merely an example. For example, the positioning management network element may configure the SRS configuration and/or the area information. For example, the positioning management network element sends the SRS configuration and/or the area information to the first access network device based on the first positioning information request message, to facilitate the first access network device to send the SRS configuration and/or the area information to the terminal, or may directly send the SRS configuration and/or the area information to the terminal. This is not limited.

F Further, if the terminal leaves the area in which the first access network device is located, the foregoing several indication manners of the first information may include the following.

(1) That the first information indicates the area change may be that the first information includes at least one of the following: the area change), moving out of the area (for example, out of the area or moving out of the area), a cell change, moving out of a cell (for example, out of the cell or moving out of the cell), an area identity, or a cell identity. In this way, the positioning management network element may learn, through the area/cell change or moving out of the area/cell, that the terminal leaves the area in which the first access network device is located, or learn, based on the cell/area identity, that the terminal is in a new area, to trigger the positioning management network element to request to configure or update the SRS configuration for the terminal, so that after the terminal moves out of the area, a network can update the SRS configuration to enable the terminal to continue to send the SRS. This ensures positioning continuity. Updating the SRS configuration may be that the network sends a new SRS configuration to the terminal, and updating the SRS configuration may also be understood as reconfiguring the SRS configuration. In addition, for specific implementations of updating the SRS configuration, refer to the related descriptions in S304. Details are not described herein.

It should be understood that the area change or moving out of the area described above means that the terminal leaves the area in which the first access network device is located, for example, the first area. The area identity may indicate an area in which the terminal is currently located, for example, indicate that the terminal is currently located in an area including a cell of the second access network device, for example, the second area. The cell identity may indicate a cell in which the terminal is currently located, for example, indicate that the terminal is currently located in a cell of the second access network device, for example, the second cell. In addition, if the area includes a plurality of cells, when the terminal moves between the plurality of cells, the SRS configuration corresponding to the area is still valid, and there is no need to reconfigure the SRS configuration, so as to save energy of the terminal. On the contrary, if the terminal leaves a cell in one area and then enters a cell in another area, an SRS configuration corresponding to the area that the terminal leaves is invalid. Therefore, the cell change or moving out of the cell described above means that the terminal leaves a cell in one area, for example, the cell of the first access network device, and then enters a cell in another area, for example, the cell of the second access network device.

(2) That the first information indicates the update of the SRS configuration may be that the first information is used to request to update the SRS configuration, that is, request to update the SRS configuration of the terminal, so that the positioning management network element may trigger to request to update the SRS configuration for the terminal, so that after the terminal moves out of the area in which the first access network device is located, the terminal can continue to send the SRS through the update of the SRS configuration, so as to continue to perform positioning on the terminal. The first information may include an information element or indication information, so as to explicitly or implicitly indicate, based on the information element or the indication information, to update the SRS configuration.

(3) That the first information indicates the update of the area may be that the first information is used to request to update the area. In other words, after the terminal performs reselection to the second access network device, the first access network device may request the positioning management network element to trigger to reconfigure the area for the terminal. For example, the positioning management network element requests the second access network device to configure the area for the terminal, the positioning management network element configures the area for the terminal by using the second access network device, or the positioning management network element configures the area for the terminal. In this way, a new area, for example, an area including the cell of the second access network device, for example, the second area, may be configured for the terminal, so that after the terminal leaves the second area, the SRS configuration of the terminal may still be triggered to be updated, to ensure that the terminal can continue to send the SRS, and ensure positioning continuity. The first information may include an information element or indication information, so as to explicitly or implicitly indicate, based on the information element or the indication information, to update the area.

Thus, if the terminal leaves the area in which the first access network device is located, for example, the first area, performs reselection to the second access network device, and enters an area including the cell of the second access network device, which may also be understood as an area in which the second access network device is located, for example, the second area, the first access network device may learn, by receiving the retrieve UE context request message from the second access network device, that the terminal has left the area in which the first access network device is located. Therefore, the first information is sent to indicate that the terminal has left the area in which the first access network device is located, request to update the SRS configuration, and request to update the area, to update the SRS configuration, so as to continue to position the terminal. The following describes the update of the SRS configuration. In addition, for ease of description, the area including the cell of the second access network device is collectively referred to as the area in which the second access network device is located below.

It may be understood that the foregoing implementation of the first information is merely an example, and is not limited. The first information may be alternatively sent by the second access network device to the positioning management network element. For example, the first access network device may send an identifier of the positioning management network element to the second access network device, for example, carry the identifier of the positioning management network element to the retrieve UE context response message. In this way, the second access network device may send the first information to the positioning management network element based on the identifier of the positioning management network element, so that the second access network device triggers to continue to position the terminal.

S304: The positioning management network element sends a second positioning information request message to the second access network device, and the second access network device receives the second positioning information request message from the positioning management network element.

The second positioning information request message may be used to request second positioning information of the terminal. The second positioning information may include, but is not limited to, the SRS configuration of the terminal, for example, an SRS configuration configured by the second access network device for the terminal. For example, optionally, the second positioning information further includes any other information related to positioning of the terminal, for example, area information configured by the second access network device for the terminal. For specific implementations, refer to the following descriptions. Optionally, the second positioning information request message may be sent to the second access network device through the AMF entity. It should be understood that before the positioning management network element sends the second positioning information request message to the second access network device, the terminal may change from the inactive state to the connected state, and the second access network device is also referred to as a current serving access network device of the terminal.

Optionally, the second access network device may configure the SRS configuration for the terminal, and a configuration manner includes S305*a* and S305*b*.

S305*a*: The second access network device sends a second RRC message to the terminal, and the terminal receives the second RRC message from the second access network device.

After receiving the second positioning information request message, the second access network device may determine the SRS configuration, for example, a second SRS configuration, for the terminal, so as to send the SRS configuration to the terminal, for example, send the second RRC message carrying the SRS configuration, where the second RRC message may be a second RRC release message or a second RRC reconfiguration message. If the second RRC message is the second RRC reconfiguration message, the second access network device may first send the RRC resume message to the terminal, so that the terminal restores from the inactive state to the connected state. Then, the second access network device sends the second RRC reconfiguration message to the terminal (in the connected state). Finally, the second access network device sends the second RRC release message to the terminal (in the connected state), to release the terminal to the inactive state, so that the terminal in the inactive state continues to send the SRS.

S305*b*: The second access network device sends a second positioning information response message to the positioning management network element, and the terminal receives the second positioning information response message from the second access network device.

The second positioning information response message carries the SRS configuration determined by the second access network device for the terminal, for example, the second SRS configuration, so that the positioning management network element obtains the SRS configuration, and triggers to continue to position the terminal. For specific implementations, refer to related descriptions in S301*c*. Details are not described herein again. In addition, an execution sequence of S305*a* and S305*b* is not limited.

Optionally, after the terminal performs reselection to the second access network device, the second access network device may configure, for the terminal, area information of the area in which the second access network device is located, for example, second area information, including at least one of the following: an area identity of the area in which the second access network device is located (referred to as a second area identity below for ease of description) or a cell list of the area in which the second access network device is located (referred to as a second cell list below for ease of description). For specific implementations of the second area identity and the second cell list, refer to related descriptions of the first area identity and the first cell list. Details are not described herein again. The area information may be carried in the second RRC message, for example, the second RRC release message or the second RRC reconfiguration message, so that the terminal can learn of a valid area in which the terminal sends the SRS, so that when moving in the area in which the second access network device is located (moving between cells in the area), the terminal may continuously send the SRS, to ensure positioning continuity in the area. The second area information and the SRS configuration configured by the second access network device for the terminal may be carried in a same RRC message, or carried in different RRC messages. This is not limited herein. Optionally, the second area information may alternatively be carried in the second positioning information response message. This is not limited herein.

It should be noted that the manner in which the second access network device configures the SRS configuration and/or the area information is merely an example. For example, the positioning management network element may configure the SRS configuration and/or the area information. For example, the positioning management network element sends the SRS configuration and/or the area information to the second access network device based on the second positioning information request message, to facilitate the second access network device to send the SRS configuration and/or the area information to the terminal, or may directly send the SRS configuration and/or the area information to the terminal. This is not limited.

Optionally, in a second application scenario of the foregoing embodiment, the method further includes S306: The terminal sends second information to the second access network device, and the second access network device receives the second information from the terminal.

The second information may indicate at least one of the following: positioning of the terminal, update of positioning information of the terminal, an area change, update of the SRS configuration, or update of the area. That the second information indicates positioning of the terminal may be that the second information includes at least one of the following: positioning, and the terminal needs to be located. That the second information indicates the update of the positioning information of the terminal may be that the second information includes: positioning information update. In addition, for specific implementations of the area change, the update of the SRS configuration, and the update of the area that are indicated by the second information, refer to related descriptions in the first information. Details are not described herein again. It may be understood that the terminal performs reselection to the second access network device from the first access network device, that is, moves out of the area in which the first access network device is located, the terminal may notify the second access network device based on the second information, to trigger the second access network device to obtain the context of the terminal as soon as possible. In addition, the second information may be carried in the RRC resume request message, to implement signaling multiplexing and reduce communication overheads.

Therefore, it can be understood from the method shown in FIG. 3 that, if the first access network device receives the retrieve UE context request message from the second access network device, the first access network device may determine that the terminal has performed reselection to the second access network device, that is, moves out of the area in which the first access network device is located. In this case, the first access network device may send the first information to the positioning management network element, to notify that the area is changed and the SRS configuration needs to be updated. In this way, after the terminal moves out of the area, the positioning management network element can be notified to update the SRS configuration, so that the terminal can continue to be positioned. In addition, when the first access network device receives the retrieve UE context request message from the second access network device, the terminal may be in the inactive state. In this way, the terminal can keep low power consumption while being continuously positioned. This facilitates energy saving.

Figure 6:
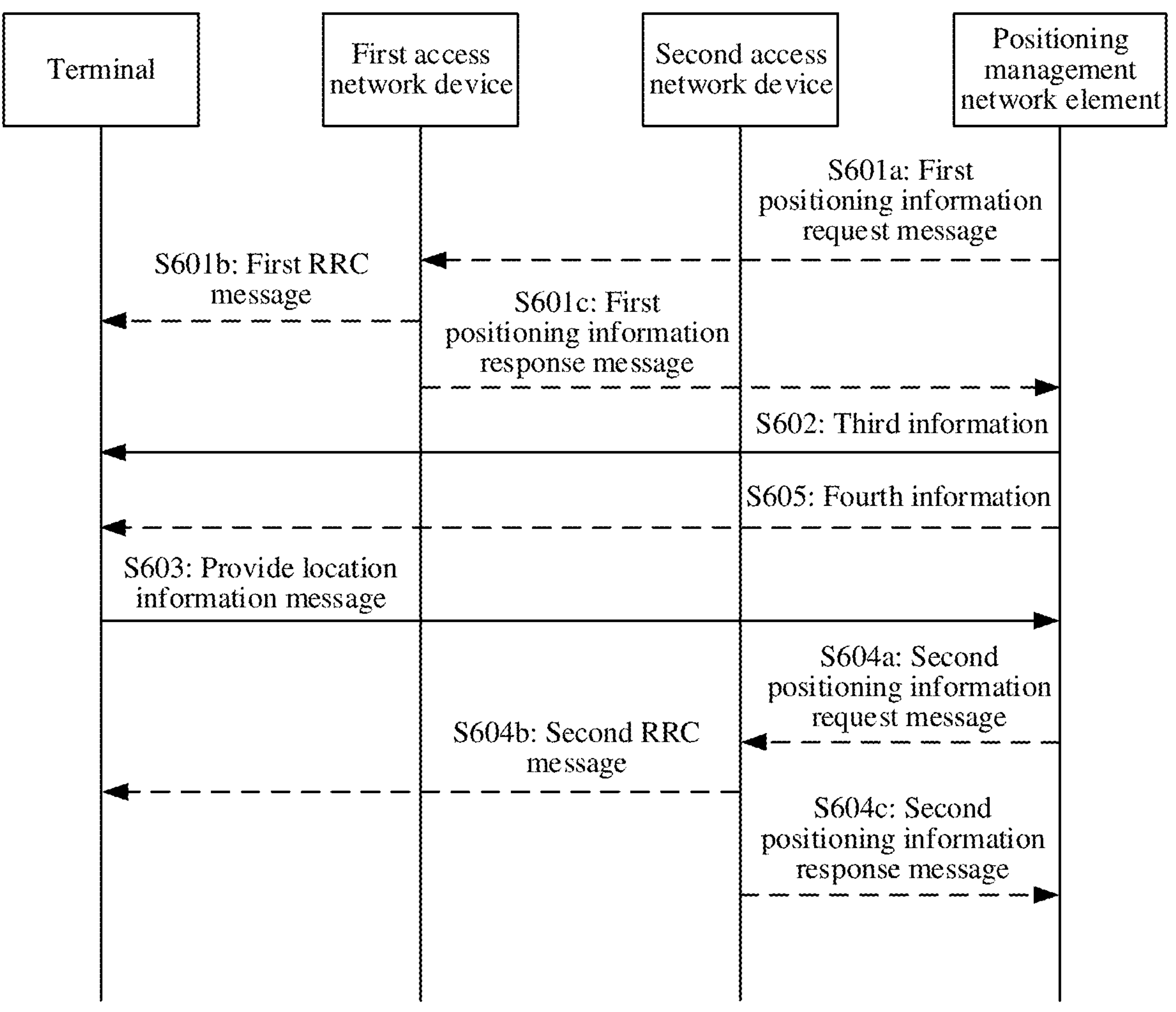
FIG. 6 is a schematic flowchart 2 of a communication method according to an embodiment.

For example, FIG. 6 is a schematic flowchart 2 of a communication method according to an embodiment. The communication method may be applied to communication between a terminal and a positioning management network element (an LMF network element) in the network architecture shown in FIG. 1. As shown in FIG. 6, the communication method includes the following steps: S602 and S603.

S602: The positioning management network element sends third information to the terminal, and the terminal receives the third information from the positioning management network element.

The third information is carried in a request location information message, or may be carried in any other message. This is not limited herein. The third information indicates a reporting trigger condition, and the reporting trigger condition includes at least one of the following: an SRS configuration of the terminal is invalid, an area is changed, or the terminal moves out of an area. The area is an area in which the SRS configuration of the terminal is valid. In addition, if the area is changed, or the terminal moves out of the area, the SRS configuration of the terminal is invalid. In this case, if the terminal device still needs to send an SRS, the SRS configuration of the terminal needs to be updated.

For example, the terminal (in an inactive state) currently camps on a first access network device, that is, the first access network device is an access network device on which the terminal currently camps, or the first access network device provides a service for the terminal (in a connected state), that is, the first access network device is a serving access network device of the terminal. Therefore, the area is an area including a cell of the first access network device, such as an area in which the first access network device is located. The SRS configuration is an SRS configuration configured by the first access network device for the terminal. If the terminal is in the area in which the first access network device is located, the SRS configuration configured by the first access network device for the terminal is valid, and the terminal may send the SRS based on the SRS configuration, to implement positioning of the terminal in the area in which the first access network device is located. If the area is changed, or the terminal moves out of the area, that is, the terminal leaves the area in which the first access network device is located, the SRS configuration configured by the first access network device for the terminal is invalid, or the SRS configuration is invalid, and the terminal cannot send the SRS based on the SRS configuration, thereby failing to implement positioning. It can be understood that, if the area of the terminal is changed, or the terminal moves out of the area, the reporting trigger condition is met, and the terminal is triggered to request to continue positioning. For specific implementations, refer to related descriptions in S603. In addition, when receiving the third information, the terminal may be in the connected state, or may be in the inactive state. This is not limited herein.

Optionally, before S602, the first access network device may configure the SRS configuration for the terminal. A configuration manner is as follows.

S601*a*: The positioning management network element sends a first positioning information request message to the first access network device, and the first access network device receives the first positioning information request message from the positioning management network element.

S601*b*: The first access network device sends a first RRC message to the terminal, and the terminal receives the first RRC message from the first access network device.

S601*c*: The first access network device sends a first positioning information response message to the positioning management network element, and the positioning management network element receives the first positioning information response message from the first access network device.

For specific implementations of S601*a* to S601*c*, refer to related descriptions of S301*a* to S301*c*. Details are not described herein again.

S603: When the SRS configuration of the terminal is invalid, the area is changed, or the terminal moves out of the area, the terminal sends a provide location information message to the positioning management network element, and the positioning management network element receives the provide location information message from the terminal.

The provide location information message is used to request the second positioning information of the terminal. For specific implementations of the second positioning information, refer to related descriptions in S304. Details are not described herein again. The provide location information message may include the first information, where the first information indicates at least one of the following: the area change, moving out of the area, a cell change, moving out of a cell, an area identity, or a cell identity. For specific implementations, refer to related descriptions in S303. Details are not described herein again. Optionally, the provide location information message may further include an enhanced cell identity-provide location information ((enhanced cell ID, ECID)—provide location information), or a new radio enhanced cell identity-provide location information (nr-ECID-provide location information), so that the positioning management network element positions the terminal based on an ECID. In addition, the provide location information message is merely an example, and is not limited thereto. The terminal may alternatively send any other possible message. This is not limited herein.

It should be noted that, in S603, the terminal may be in the inactive state, or may be in the connected state. This is not limited when the area is changed, or the terminal moves out of the area. If the terminal is in the inactive state, an understanding that the area is changed, or the terminal moves out of the area may be the same as that in S303, that is, the terminal performs reselection to the second access network device from the first access network device. In this case, the second access network device is also referred to as an access network device on which the terminal camps. If the terminal is in the connected state, that the area is changed, or the terminal moves out of the area may mean that the terminal is switched from the first access network device to the second access network device. In this case, the second access network device is also referred to as a serving access network device of the terminal.

Further, in an implementation, if the terminal in the connected state changes the area or moves out of the area, the terminal (in the connected state) may directly send the provide location information message (where the provide location information message is signaling in the connected state) to the positioning management network element.

Alternatively, in another implementation, if the terminal in the inactive state changes the area or moves out of the area, the terminal may first restore from the inactive state to the connected state, and then send the provide location information message. For specific implementations, refer to related descriptions in 305*a*. Details are not described herein again. Alternatively, the terminal may send the provide location information message in a small data transfer manner. For example, the terminal may carry the provide location information message to signaling in the inactive state, for example, an RRC resume request message, or any other possible signaling. This is not limited herein. In this way, after receiving the RRC resume request message, the second access network device may strip the provide location information message from the RRC resume request message, and then send the provide location information message to the positioning management network element.

For the positioning management network element, after the positioning management network element receives the provide location information message, the provide location information message may trigger the positioning management network element to request the SRS configuration configured by the second access network device for the terminal. A configuration manner is as follows.

S604*a*: The positioning management network element sends a second positioning information request message to the second access network device, and the second access network device receives the second positioning information request message from the positioning management network element.

S604*b*: The second access network device sends a second RRC message to the terminal, and the terminal receives the second RRC message from the second access network device.

S604*c*: The second access network device sends a second positioning information response message to the positioning management network element, and the terminal receives the second positioning information response message from the second access network device.

For specific implementations of S604*a* to S604*c*, refer to related descriptions in S304 and S305*a* and S305*b*. Details are not described herein again.

Optionally, in a third application scenario of the foregoing embodiment, before S603, the method may further include S605: The positioning management network element sends fourth information to the terminal, and the terminal receives the fourth information from the positioning management network element.

The fourth information may include area information, for example, area information of the area in which the first access network device is located, such as first area information. For specific implementations, refer to related descriptions in S301*a* to S301*c*. Details are not described herein again. The fourth information and the third information may be in a same message, or may be in different messages. This is not limited. In this way, the terminal may learn, based on the fourth information, a valid area in which the terminal sends the SRS, so that when moving in the area in which the first access network device is located (moving between cells in the area), the terminal may continuously send the SRS. This ensures positioning continuity in the area.

Therefore, according to the method shown in FIG. 6, the reporting trigger condition is configured for the terminal, so that the terminal can send the provide location information message to the positioning management network element when the SRS configuration is invalid, the area is changed, or the terminal moves out of the area, so that the positioning management network element can trigger update of the SRS configuration of the terminal, and after the terminal moves out of the area, the terminal can continue to send the SRS by configuring or updating the SRS configuration, so that the terminal can continue to be positioned.

The foregoing describes, in detail with reference to FIG. 3 to FIG. 6, the communication methods provided in embodiments. The following describes, in detail with reference to FIG. 7 to FIG. 9, a communication apparatus configured to perform the communication method provided in embodiments.

Figure 7:
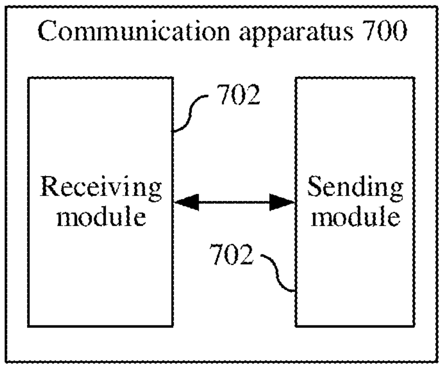
FIG. 7 is a schematic diagram 1 of a structure of a communication apparatus according to an embodiment.

For example, FIG. 7 is a schematic diagram 1 of a structure of a communication apparatus according to an embodiment. As shown in FIG. 7, the communication apparatus 700 includes a receiving module 701 and a sending module 702. For ease of description, FIG. 7 shows only main components of the communication apparatus.

In some embodiments, the communication apparatus 700 may be used in the network architecture shown in FIG. 1, and perform the function of the first access network device in the method shown in FIG. 3.

The receiving module 701 is configured to receive a retrieve UE context request message from a second access network device. The sending module 702 is configured to send first information to a positioning management network element. The first information indicates at least one of the following: an area change, update of a sounding reference signal (SRS) configuration, or update of an area. The area is an area in which the SRS configuration configured by the first access network device for a terminal is valid.

In a possible solution, one area includes at least one cell. That the first information indicates the area change may include that the first information includes at least one of the following: the area change, moving out of the area, a cell change, moving out of a cell, an area identity, or a cell identity.

In a possible solution, that the first information indicates the update of the SRS configuration may include that the first information is used to request to update the SRS configuration.

In a possible solution, that the first information indicates the update of the area may include that the first information is used to request to update the area.

In a possible solution, the first information may be carried in a positioning information update message.

In a possible solution, the receiving module 701 may be further configured to: before receiving the retrieve UE context request message from the second access network device, receive a first positioning information request message from the positioning management network element, where the first positioning information request message is used to request first positioning information of the terminal. Optionally, the first positioning information includes area information of the area.

Optionally, the sending module 702 may be further configured to: after the receiving module 701 receives the first positioning information request message from the positioning management network element, send a first positioning information response message to the positioning management network element, where the first positioning information response message may carry the first positioning information of the terminal.

In a possible solution, the retrieve UE context request message carries second information, and the second information indicates at least one of the following: the area change, the update of the SRS configuration, the update of the area, update of positioning information of the terminal, or positioning of the terminal.

In a possible solution, the area is a positioning area.

Optionally, the sending module 702 and the receiving module 701 may also be integrated into one module, for example, a transceiver module (not shown in FIG. 7). The transceiver module is configured to implement a sending function and a receiving function of the communication apparatus 700.

Optionally, the communication apparatus 700 may further include a processing module (not shown in FIG. 7). The processing module is configured to implement a processing function of the communication apparatus 700.

Optionally, the communication apparatus 700 may further include a storage module (not shown in FIG. 7), and the storage module stores a program or instructions. When the processing module executes the program or the instructions, the communication apparatus 700 can perform the function of the first access network device in the method shown in FIG. 3.

It should be understood that the processing module in the communication apparatus 700 may be implemented by a processor or a processor-related circuit component, or may be a processor or a processing unit. The transceiver module may be implemented by a transceiver or a transceiver-related circuit component, or may be a transceiver or a transceiver unit.

It should be noted that the communication apparatus 700 may be a network device, for example, a first access network device, may be a chip (system) or another part or component that may be disposed in a network device, or may be an apparatus including a network device. This is not limited.

In addition, for effects of the communication apparatus 700, refer to corresponding effects in the method shown in FIG. 3. Details are not described herein again.

In some other embodiments, the communication apparatus 700 may be used in the network architecture shown in FIG. 1, and perform the function of the positioning management network element in the method shown in FIG. 3.

The receiving module 701 is configured to receive first information from the first access network device. The sending module 702 is configured to send a second positioning information request message to a second access network device. The first information indicates at least one of the following: an area change, update of an SRS configuration, or update of an area, and the area is an area in which the SRS configuration configured by the first access network device for a terminal is valid. The first access network device is an anchor access network device of the terminal, the second access network device is an access network device on which the terminal currently camps, and the second positioning information request message is used to request second positioning information of the terminal.

It should be understood that before the positioning management network element sends the second positioning information request message to the second access network device, the terminal may change from an inactive state to a connected state, and the second access network device is also referred to as a current serving access network device of the terminal.

In a possible solution, that the first information indicates the area change may include that the first information includes at least one of the following: the area change, moving out of the area, a cell change, moving out of a cell, an area identity, or a cell identity, where one area includes at least one cell.

In a possible solution, that the first information indicates the update of the SRS configuration may include that the first information is used to request to update the SRS configuration.

In a possible solution, that the first information indicates the update of the area may include that the first information is used to request to update the area.

In a possible solution, the first information may be carried in a positioning information update message.

In a possible solution, the sending module 702 may be further configured to: before the receiving module 701 receives the first information from the first access network device, send a first positioning information request message to the first access network device, where the first positioning information request message is used to request first positioning information of the terminal. Optionally, the first positioning information includes area information of the area.

Optionally, the receiving module 701 may be further configured to: after the sending module 702 sends the first positioning information request message to the first access network device, receive a first positioning information response message from the first access network device, where the first positioning information response message may carry the first positioning information of the terminal.

In a possible solution, the receiving module 701 may be further configured to: after the sending module sends the second positioning information request message to the second access network device, receive a second positioning information response message from the second access network device, where the second positioning information response message includes the second positioning information of the terminal.

In a possible solution, the area is a positioning area.

Optionally, the sending module 702 and the receiving module 701 may also be integrated into one module, for example, a transceiver module (not shown in FIG. 7). The transceiver module is configured to implement a sending function and a receiving function of the communication apparatus 700.

Optionally, the communication apparatus 700 may further include a processing module (not shown in FIG. 7). The processing module is configured to implement a processing function of the communication apparatus 700.

Optionally, the communication apparatus 700 may further include a storage module (not shown in FIG. 7), and the storage module stores a program or instructions. When the processing module executes the program or the instructions, the communication apparatus 700 can perform the function of the positioning management network element in the method shown in FIG. 3.

It should be understood that the processing module in the communication apparatus 700 may be implemented by a processor or a processor-related circuit component, or may be a processor or a processing unit. The transceiver module may be implemented by a transceiver or a transceiver-related circuit component, or may be a transceiver or a transceiver unit.

It should be noted that the communication apparatus 700 may be a network device, for example, a positioning management network element, may be a chip (system) or another part or component that may be disposed in a network device, or may be an apparatus including a network device. This is not limited.

In addition, for effects of the communication apparatus 700, refer to corresponding effects in the method shown in FIG. 3. Details are not described herein again.

In some other embodiments, the communication apparatus 700 may be used in the network architecture shown in FIG. 1, and perform the function of the positioning management network element in the method shown in FIG. 6.

The sending module 701 is configured to send third information to a terminal. The receiving module 702 is configured to receive a provide location information message from the terminal. The third information indicates a reporting trigger condition, and the reporting trigger condition includes at least one of the following: an SRS configuration of the terminal is invalid, an area is changed, or the terminal moves out of an area. The area is an area in which the SRS configuration of the terminal is valid. In addition, if the area is changed, or the terminal moves out of the area, the SRS configuration of the terminal is invalid. In this case, if the terminal device still needs to send an SRS, the SRS configuration of the terminal needs to be updated.

In a possible solution, the provide location information message may include first information, where the first information includes at least one of the following: the area change, moving out of the area, a cell change, moving out of a cell, an area identity, or a cell identity, where one area includes at least one cell.

In a possible solution, the third information may be carried in a request location information message.

In a possible solution, the sending module 701 may be further configured to: before the receiving module 702 receives the provide location information message from the terminal, send fourth information to the terminal, where the fourth information includes area information, and the area information includes at least one of the following: the area identity of the area or a cell list of the area.

In a possible solution, the fourth information may be carried in a request location information message, and the fourth information and the third information may be in a same message, or may be in different messages. This is not limited.

Optionally, the sending module 702 and the receiving module 701 may also be integrated into one module, for example, a transceiver module (not shown in FIG. 7). The transceiver module is configured to implement a sending function and a receiving function of the communication apparatus 700.

Optionally, the communication apparatus 700 may further include a processing module (not shown in FIG. 7). The processing module is configured to implement a processing function of the communication apparatus 700.

Optionally, the communication apparatus 700 may further include a storage module (not shown in FIG. 7), and the storage module stores a program or instructions. When the processing module executes the program or the instructions, the communication apparatus 700 can perform the function of the positioning management network element in the method shown in FIG. 6.

It should be understood that the processing module in the communication apparatus 700 may be implemented by a processor or a processor-related circuit component, or may be a processor or a processing unit. The transceiver module may be implemented by a transceiver or a transceiver-related circuit component, or may be a transceiver or a transceiver unit.

It should be noted that the communication apparatus 700 may be a network device, for example, a positioning management network element, may be a chip (system) or another part or component that may be disposed in a network device, or may be an apparatus including a network device. This is not limited.

In addition, for effects of the communication apparatus 700, refer to corresponding effects in the method shown in FIG. 6. Details are not described herein again.

Figure 8:
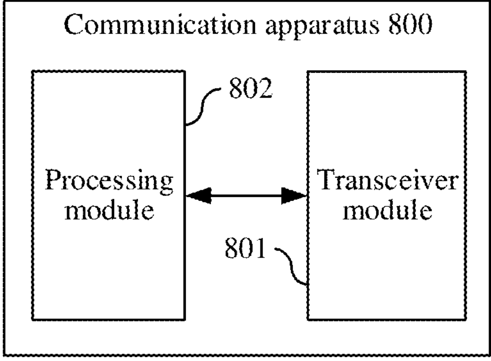
FIG. 8 is a schematic diagram 2 of a structure of a communication apparatus according to an embodiment.

For example, FIG. 8 is a schematic diagram 2 of a structure of a communication apparatus according to an embodiment. As shown in FIG. 8, the communication apparatus 800 includes a transceiver module 801 and a processing module 802. For ease of description, FIG. 8 shows only main components of the communication apparatus.

In some embodiments, the communication apparatus 800 may be used in the network architecture shown in FIG. 1, and perform the function of the terminal in the method shown in FIG. 3.

The processing module 802 is configured to reselect the communication apparatus 800 from a first access network device to a second access network device. The transceiver module 801 is configured to send second information to the second access network device. The first access network device is an anchor access network device of the apparatus, and the second access network device is an access network device on which the apparatus currently camps. The second information indicates at least one of the following: an area change, update of an SRS configuration, update of an area, update of positioning information of the apparatus, or positioning of the apparatus. The area is an area in which the SRS configuration configured by the first access network device for the apparatus is valid.

In a possible solution, the second information is carried in an RRC resume request message.

Optionally, the transceiver module 801 may further include a sending module and a receiving module (not shown in FIG. 8). The sending module is configured to implement a sending function of the communication apparatus 800, and the receiving module is configured to implement a receiving function of the communication apparatus 800.

Optionally, the communication apparatus 800 may further include a storage module (not shown in FIG. 8). The storage module stores a program or instructions. When the processing module executes the program or the instructions, the communication apparatus 800 can perform the function of the terminal in the method shown in FIG. 3.

It should be understood that the processing module in the communication apparatus 800 may be implemented by a processor or a processor-related circuit component, or may be a processor or a processing unit. The transceiver module may be implemented by a transceiver or a transceiver-related circuit component, or may be a transceiver or a transceiver unit.

It should be noted that the communication apparatus 800 may be a terminal, may be a chip (system) or another part or component that may be disposed in a terminal, or may be an apparatus including a terminal. This is not limited.

In addition, for effects of the communication apparatus 800, refer to corresponding effects in the method shown in FIG. 3. Details are not described herein again.

In some other embodiments, the communication apparatus 800 may be used in the network architecture shown in FIG. 1, and perform the function of the terminal in the method shown in FIG. 6.

The transceiver module 801 is configured to receive third information from a positioning management network element.

The processing module 802 is configured to control the transceiver module 801 to send a provide location information message to the positioning management network element when an SRS configuration of the communication apparatus 800 is invalid, an area is changed, or the communication apparatus moves out of an area. The third information indicates a reporting trigger condition, and the reporting trigger condition includes at least one of the following: The SRS configuration of the apparatus is invalid, the area is changed, or the apparatus moves out of the area. The area is an area in which the SRS configuration of the apparatus is valid. In addition, if the area is changed, or the apparatus moves out of the area, the SRS configuration of the apparatus is invalid. In this case, if the apparatus still needs to send an SRS, the SRS configuration of the apparatus needs to be updated.

In a possible solution, the provide location information message may include first information, where the first information includes at least one of the following: the area change, moving out of the area, a cell change, moving out of a cell, an area identity, or a cell identity, where one area includes at least one cell.

Optionally, the transceiver module 801 may be further configured to: after sending the provide location information message to the positioning management network element, receive an SRS configuration from a second access network device, where the second access network device is an access network device on which the communication apparatus 800 camps or a serving access network device.

In a possible solution, the third information may be carried in a request location information message.

In a possible solution, the transceiver module 801 may be further configured to: before sending the provide location information message to the positioning management network element, receive fourth information from the positioning management network element, where the fourth information includes area information, and the area information includes at least one of the following: the area identity of the area or a cell list of the area.

Optionally, the fourth information may be carried in a request location information message. In addition, the fourth information and the third information may be in a same message, or may be in different messages. This is not limited.

In a possible solution, the area is a positioning area.

Optionally, the transceiver module 801 may further include a sending module and a receiving module (not shown in FIG. 8). The sending module is configured to implement a sending function of the communication apparatus 800, and the receiving module is configured to implement a receiving function of the communication apparatus 800.

Optionally, the communication apparatus 800 may further include a storage module (not shown in FIG. 8). The storage module stores a program or instructions. When the processing module executes the program or the instructions, the communication apparatus 800 can perform the function of the terminal in the method shown in FIG. 6.

It should be understood that the processing module in the communication apparatus 800 may be implemented by a processor or a processor-related circuit component, or may be a processor or a processing unit. The transceiver module may be implemented by a transceiver or a transceiver-related circuit component, or may be a transceiver or a transceiver unit.

It should be noted that the communication apparatus 800 may be a terminal, may be a chip (system) or another part or component that may be disposed in a terminal, or may be an apparatus including a terminal. This is not limited.

In addition, for effects of the communication apparatus 800, refer to corresponding effects in the method shown in FIG. 6. Details are not described herein again.

Figure 9:
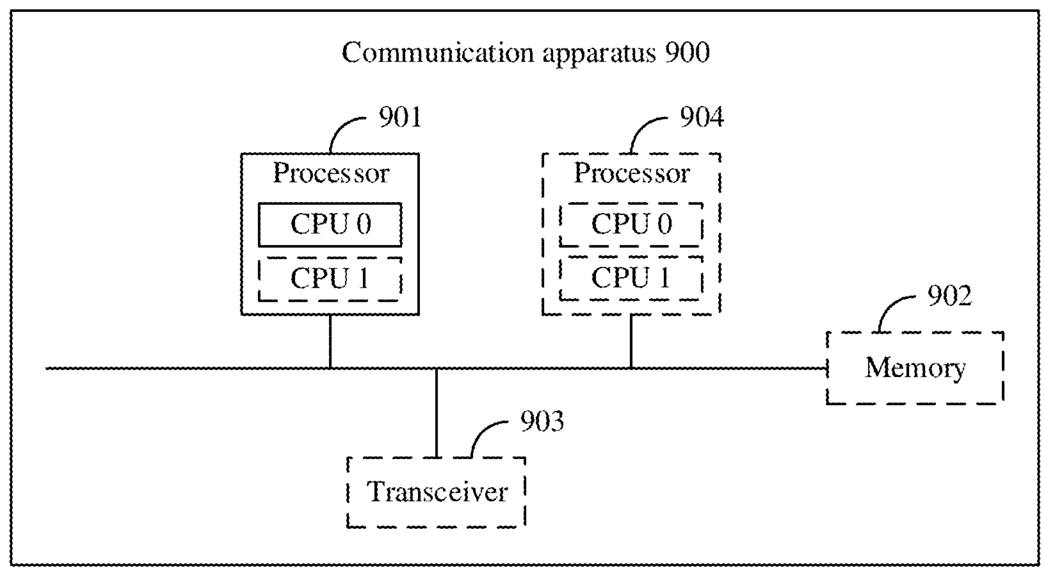
FIG. 9 is a schematic diagram 3 of a structure of a communication apparatus according to an embodiment.

For example, FIG. 9 is a schematic diagram 4 of a structure of a communication apparatus according to an embodiment. The communication apparatus may be a terminal device or a network device, or may be a chip (system) or another component or assembly that may be disposed in the terminal device or the network device. As shown in FIG. 9, the communication apparatus 900 may include a processor 901. Optionally, the communication apparatus 900 may further include a memory 902 and/or a transceiver 903. The processor 901 is coupled to the memory 902 and the transceiver 903, for example, may be connected through a communication bus.

The following describes various components of the communication apparatus 900 with reference to FIG. 9.

The processor 901 is a control center of the communication apparatus 900, and may be one processor, may be a general term of a plurality of processing elements, or may be referred to as a logic circuit. For example, the processor 901 is one or more central processing units (CPUs), or an application-specific integrated circuit (ASIC), or may be configured as one or more integrated circuits implementing embodiments, for example, one or more microprocessors (DSPs) or one or more field programmable gate arrays (FPGAs).

Optionally, the processor 901 may perform various functions of the communication apparatus 900 by running or executing a software program stored in the memory 902 and invoking data stored in the memory 902.

In a specific implementation, in an embodiment, the processor 901 may include one or more CPUs, for example, a CPU 0 and a CPU 1 that are shown in FIG. 9.

In specific implementation, in an embodiment, the communication apparatus 900 may alternatively include a plurality of processors, for example, the processor 901 and a processor 904 shown in FIG. 2. Each of the processors may be a single-CPU processor, or may be a multi-CPU processor. The processor herein may be one or more devices, circuits, and/or processing cores configured to process data (for example, computer program instructions).

The memory 902 is configured to store a software program for performing the solutions of the embodiments, and is controlled by the processor 901, so that the method shown in FIG. 3 or the method shown in FIG. 6 is performed.

Optionally, the memory 902 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. However, this is not limited herein. The memory 902 may be integrated with the processor 901, or may exist independently, and is coupled to the processor 901 by using an interface circuit of the communication apparatus 900 or an input/output interface (not shown in FIG. 9). This is not limited in embodiments.

The transceiver 903 is configured to communicate with another communication apparatus. For example, the communication apparatus 900 is a terminal, and the transceiver 903 may be configured to communicate with a network device or communicate with another terminal device. For another example, the communication apparatus 900 is a network device, and the transceiver 903 may be configured to communicate with a terminal, or communicate with another network device.

Optionally, the transceiver 903 may include a receiver and a transmitter (not separately shown in FIG. 9). The receiver is configured to implement a receiving function, and the transmitter is configured to implement a sending function.

Optionally, the transceiver 903 may be integrated with the processor 901, or may exist independently, and is coupled to the processor 901 by using the interface circuit (not shown in FIG. 9) of the communication apparatus 900. This is not limited in embodiments.

It should be noted that the structure of the communication apparatus 900 shown in FIG. 9 does not constitute a limitation on the communication apparatus. An actual communication apparatus may include more or fewer components than those shown in the figure, or combine some components, or have different component arrangement.

In addition, for effects of the communication apparatus 900, refer to the effects of the communication method in the foregoing method embodiments. Details are not described herein again.

An embodiment provides a communication system. The communication system includes the foregoing one or more terminals and one or more network devices.

It should be understood that the processor in embodiments may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory in embodiments may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, a circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments are all or partially generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, infrared, radio, and microwave) manner. The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" describes only an association relationship between associated objects, and indicates that three relationships may exist. For example, A and/or B may indicate the following three cases: only A exists, both A and B exist, and only B exists. A and B may be singular or plural. In addition, the character "/" in can indicate an "or" relationship between associated objects, or may indicate an "and/or" relationship. A specific meaning depends on the context.

In the embodiments, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments. The execution sequences of the processes should be determined based on functions and internal logic of the processes, and should not be construed as any limitation on the implementation processes of embodiments.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments may be integrated into one processing unit, each of the units may exist alone physically, or two or more units may be integrated into one unit.

When the functions are implemented in a form of a software function unit and sold or used as an independent product, the functions may be stored in a non-transitory computer-readable storage medium. Based on such an understanding, the solutions essentially, or the part contributing to the conventional technologies, or some of the solutions may be implemented in a form of a software product. The computer software product is stored in a storage medium, and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended as limiting. Any variation or replacement readily figured out by a person skilled in the art shall fall within the scope of the embodiments.

What is claimed is:

1. A communication method, comprising:

receiving, by a first access network device, a retrieve user equipment (UE) context request message from a second access network device; and sending, by the first access network device, first information to a positioning management network element, wherein a valid area is an area in which the sounding reference signal (SRS) configuration configured by the first access network device for a terminal is valid, and wherein the first information indicates at least one of:

an area change of the valid area, update of the (SRS) configuration, or update of the valid area.

2. The method according to claim 1, wherein before receiving, by the first access network device, the retrieve UE context request message from a second access network device, the method further comprises:

receiving, by the first access network device, a first positioning information request message from the positioning management network element, wherein the first positioning information request message is used to request first positioning information of the terminal, and the first positioning information comprises area information of the valid area; and sending, by the first access network device, a first positioning information response message to the positioning management network element, wherein the first positioning information response message carries the first positioning information.

3. The method according to claim 1, wherein the retrieve UE context request message carries second information, and the second information indicates at least one of:

an area change of the valid area, update of the SRS configuration, update of the valid area, update of positioning information of the terminal, or positioning of the terminal.

4. The method according to claim 1, wherein the first information indicating an area change of the valid area comprises:

at least one of:

an area change of the valid area, moving out of the valid area, a cell change, moving out of a cell, a new area identity, or a new cell identity, wherein the valid area comprises at least one cell.

5. The method according to claim 1, wherein the first information is carried in a positioning information update message.

6. A communication method, comprising:

receiving, by a positioning management network element, first information from a first access network device, wherein a valid area is an area in which the sounding reference signal (SRS) configuration configured by the first access network device for a terminal is valid, and wherein the first information indicates at least one of:

an area change of the valid area, update of the SRS configuration, or update of the valid area, wherein the first access network device is an anchor access network device of a terminal; and sending, by the positioning management network element, a second positioning information request message to a second access network device, wherein the second access network device is an access network device on which the terminal currently camps, and the second positioning information request message is used to request second positioning information of the terminal.

7. The method according to claim 6, wherein before receiving, by the positioning management network element, first information from a first access network device, the method further comprises:

sending, by the positioning management network element, a first positioning information request message to the first access network device, wherein the first positioning information request message is used to request first positioning information of the terminal, and the first positioning information comprises area information of the valid area; and receiving, by the positioning management network element, a first positioning information response message from the first access network device, wherein the first positioning information response message carries the first positioning information.

8. The method according to claim 6, wherein after sending, by the positioning management network element, the second positioning information request message to a second access network device, the method further comprises:

receiving, by the positioning management network element, a second positioning information response message from the second access network device, wherein the second positioning information response message comprises second positioning information of the terminal.

9. The method according to claim 6, wherein the first information indicating an area change of the valid area comprises:

at least one of:

an area change of the valid area, moving out of the valid area, a cell change, moving out of a cell, a new area identity, or a new cell identity, wherein the valid area comprises at least one cell.

10. The method according to claim 6, wherein the first information is carried in a positioning information update message.

11. A communication apparatus, comprising a receiver and a sender, wherein the receiver is configured to receive a retrieve user equipment (UE) context request message from a second access network device; and the sender is configured to send first information to a positioning management network element, wherein a valid area is an area in which the sounding reference signal (SRS) configuration configured by the communication apparatus for a terminal is valid, and wherein the first information indicates at least one of:

an area change of the valid area, update of the SRS configuration, or update of the valid area.

12. The apparatus according to claim 11, wherein the receiver is further configured to: before receiving the retrieve UE context request message from the second access network device, receive a first positioning information request message from the positioning management network element, wherein the first positioning information request message is used to request first positioning information of the terminal, and the first positioning information comprises area information of the valid area; and the sender is further configured to send a first positioning information response message to the positioning management network element, wherein the first positioning information response message carries the first positioning information.

13. The apparatus according to claim 11, wherein the retrieve UE context request message carries second information, and the second information indicates at least one of:

an area change of the valid area, update of the SRS configuration, update of the valid area, update of positioning information of the terminal, or positioning of the terminal.

14. The apparatus according to claim 11, wherein the first information indicating an area change of the valid area comprises at least one of:

an area change of the valid area, moving out of the valid area, a cell change, moving out of a cell, a new area identity, or a new cell identity, wherein the valid area comprises at least one cell.

15. The apparatus according to claim 11, wherein the first information is carried in a positioning information update message.

16. The method according to claim 1, wherein the valid area is a positioning area.

17. The method according to claim 1, wherein when the first information indicates the update of the SRS configuration, the first information is used to request to update the SRS configuration of the terminal.

18. The method according to claim 1, wherein when the first information indicates the update of the valid area, the first information is used to request to update the valid area, and wherein requesting to update the valid area comprises requesting to update area information to indicate a valid area that includes a cell of the second access network device.

19. The method according to claim 1, wherein the valid area is indicated by area information, wherein the area information comprises at least one of an area identity or a cell list, and wherein the cell list comprises at least one cell identity.

20. The method according to claim 1, wherein the valid area further includes a cell of a neighboring access network device of the first access network device.

* * * * *